(12) United States Patent
Kim

(10) Patent No.: US 11,775,209 B2
(45) Date of Patent: Oct. 3, 2023

(54) CONTROLLER AND OPERATION METHOD THEREOF

(71) Applicant: SK hynix Inc., Gyeonggi-do (KR)

(72) Inventor: Kwang-Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 587 days.

(21) Appl. No.: 16/849,469

(22) Filed: Apr. 15, 2020

(65) Prior Publication Data

US 2021/0149597 A1 May 20, 2021

(30) Foreign Application Priority Data

Nov. 20, 2019 (KR) .................. 10-2019-0149207

(51) Int. Cl.
*G06F 3/06* (2006.01)

(52) U.S. Cl.
CPC .......... *G06F 3/0659* (2013.01); *G06F 3/0604* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,560,879 B1* | 10/2013 | Goel | .................. | G06F 11/1662 714/6.1 |
| 8,909,657 B2* | 12/2014 | Mensch | ................ | G06F 16/183 707/755 |
| 2011/0264843 A1* | 10/2011 | Haines | .................. | G06F 3/0679 711/170 |
| 2013/0073816 A1* | 3/2013 | Seo | ..................... | G06F 12/0246 711/E12.001 |
| 2016/0283116 A1* | 9/2016 | Ramalingam | ......... | G06F 3/0629 |
| 2017/0109096 A1 | 4/2017 | Jean et al. | | |
| 2017/0269875 A1* | 9/2017 | Kim | ..................... | G06F 12/0653 |
| 2020/0401334 A1* | 12/2020 | Saxena | .................. | G06F 3/064 |

\* cited by examiner

*Primary Examiner* — Idriss N Alrobaye
*Assistant Examiner* — Dayton Lewis-Taylor
(74) *Attorney, Agent, or Firm* — IP & T GROUP LLP

(57) ABSTRACT

A controller for controlling a memory device may include: a sequence detector suitable for determining, each time a set number of data chunks are processed, whether the set number of recently processed data chunks are sequential data chunks, based on the lengths of the data chunks and logical-address-adjacency of the data chunks; and a processor suitable for performing a sequential operation according to the determination result, until next determination.

14 Claims, 5 Drawing Sheets

CONTROLLER AND OPERATION METHOD THEREOF

CROSS-REFERENCE TO RELATED APPLICATION

This application claims priority under 35 U.S.C. § 119 to Korean Patent Application No. 10-2019-0149207 filed on Nov. 20, 2019, which is incorporated herein by reference in its entirety.

BACKGROUND

1. Field

Various embodiments relate to a controller for controlling a memory device.

2. Discussion of the Related Art

The computer environment paradigm has been transitioning to ubiquitous computing, which enables computing systems to be used virtually anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a controller capable of effectively distinguishing between sequential commands and random commands, and an operation method thereof.

In an embodiment, a controller for controlling a memory device includes: a sequence detector suitable for determining, each time a set number of data chunks are processed, whether the set number of recently processed data chunks are sequential data chunks, based on the lengths of the data chunks and logical-address-adjacency of the data chunks; and a processor suitable for performing a sequential operation according to the determination result until next determination.

In an embodiment, an operation method of a controller for controlling a memory device, the operation method includes: determining, each time a set number of data chunks are processed, whether the set number of recently processed data chunks are sequential data chunks, based on the lengths of the data chunks and logical-address-adjacency of the data chunks; and performing a sequential operation according to the determination result until next determination.

In an embodiment, an operating method of a controller, the operating method includes: controlling a memory device to perform a write operation on a first set number of data chunks, the data chunks having the same length as one another; detecting adjacent start logical addresses falling within at least one among first and second ranges having an initial start logical address and a minimum start logical address among start logical addresses of the respective data chunks; determining the data chunks as sequential when a number of the adjacent start logical addresses is greater than a threshold; and controlling the memory device to perform a sequential operation on a second set number of subsequently provided data chunks based on the determination.

In accordance with the present embodiments, it possible to provide a controller capable of effectively distinguishing between sequential commands and random commands, and an operation method thereof.

DETAILED DESCRIPTION

Hereafter, various embodiments of the present invention will be described with reference to the accompanying drawings. It should be understood that the following descriptions will be focused on portions required for understanding an operation in accordance with an embodiment, and descriptions of the other portions will be ruled out in order not to unnecessarily obscure subject matters of the present disclosure.

Hereafter, example embodiments will be described in detail with reference to the accompanying drawings.

Figure 1:
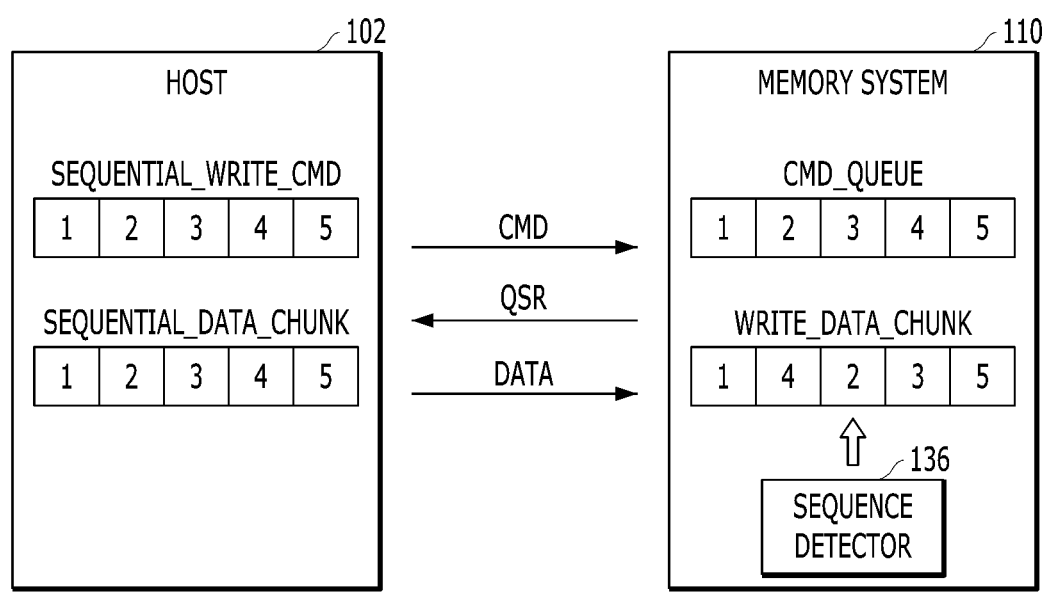
FIG. 1 is a diagram illustrating a data processing system in accordance with an embodiment of the present invention.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

Data of the host 102, which are stored in the memory system 110, may be divided into sequential data and random data. Examples of the sequential data may include consecutive data constituting a large file, and examples of the random data may include system data. The host 102 may apply consecutive logical addresses to the sequential data.

When sequential data are received from the host 102, the memory system 110 may perform a sequential operation to improve the operation performance thereof.

When sequential data are received from the host 102, less data fragmentation occurs. Thus, the sequential operation may lead the memory system 110 to perform a garbage collection operation less frequently than when random data are received. When the garbage collection operation is less frequently performed as a background operation, the foreground operation performance of the memory system 110 may be improved.

As an example of the sequential operation, the memory system 110 may store sequential data in a sequential memory region separately from random data, when the sequential data are received from the host 102. In an implementation, the memory system 110 may determine a single level cell block as the sequential memory region in order to improve access performance to the sequential data, or determine a multi-level cell memory block as the sequential memory region in order to store large sequential data using a small memory region. When the sequential data are stored separately from the random data, the memory system 110 may prevent fragmentation of the sequential data from occurring due to update of the random data.

The host 102 may divide the sequential data into a plurality of data chunks when storing the sequential data in the memory system 110. The host 102 may provide the memory system 110 with a plurality of write commands corresponding to the respective data chunks.

The memory system 110 may determine whether sequential data chunks are received from the host 102 and perform the sequential operation according to the determination result. For example, the memory system 110 may determine whether the logical address of a previously-received data chunk is sequential with the logical address of a data chunk which is received immediately after the previously-received data chunk. However, an operation of the host 102 or the memory system 110 may cause a change in the sequence of data chunks constituting sequential data. Due to a change in the sequence of data chunks within the sequential data, the sequential data may not be sequential and thus the memory system 110 may erroneously identify, when determining the sequence of the data chunks, that the data chunks are non-sequential data.

FIG. 1 illustrates an example in which the logical addresses of data received by the memory system 110 are not sequential, even though the host 102 provides sequential data to the memory system 110.

In the example of FIG. 1, the host 102 may divide the sequential data into five data chunks SEQUENTIAL_DATA_CHUNK whose logical addresses are sequential, and generate first to fifth commands SEQUENTIAL_WRITE_CMD corresponding to the five data chunks. The host 102 may provide the first to fifth commands to the memory system 110 at the same time.

The memory system 110 may queue the first to fifth commands in a command queue CMD_QUEUE. The memory system 110 may set and release a queue state register QSR corresponding to each of the queued first to fifth commands, and thus inform the host 102 of whether the corresponding command can be processed (e.g., whether a write data corresponding to a write command can be written into the memory device 150). By referring to the queue state registers QSR, the host 102 may first provide the memory system 110 with data for a command which can be preferentially processed. Commands queued in the command queue CMD_QUEUE may not be necessarily processed according to the sequence of corresponding logical addresses. Depending on preference or priority of the commands queued in the command queue CMD_QUEUE, data chunks of sequential data may not be provided to the memory system 110 according to the sequence of corresponding logical addresses.

FIG. 1 illustrates the case in which write data chunks corresponding to the first to fifth commands are received in the sequence of the first, fourth, second, third and fifth data chunks WRITE_DATA_CHUNK, and processed according to the sequence in which the data chunks are received. When determining whether sequential data chunks are received, based on whether the logical addresses of recently consecutively processed data chunks are sequential, the memory system 110 may determine that random data chunks are received at the moment. For example, the logical address of the first data chunk which is first processed may not be sequential with the logical address of the fourth data chunk which is processed after the first data chunk. When the memory system 110 cannot normally determine whether the sequential data chunks are received, the memory system 110 cannot perform the sequential operation in time. Thus, the performance of the memory system 110 may be degraded.

In accordance with the present embodiment, the memory system 110 may determine whether sequential data chunks are received, even though the logical address of a previously-received data chunk is not sequential with the logical address of a data chunk which is received immediately after the previously-received data chunk. The memory system 110 in accordance with the present embodiment may include a sequence detector 136. The sequence detector 136 may determine whether a set number of recently processed data chunks are sequential data chunks based on the lengths and logical-address-adjacency of the recently processed data chunks. The memory system 110 may perform the sequential operation based on the determination of the sequence detector 136, thereby improving the performance thereof.

Figure 2:
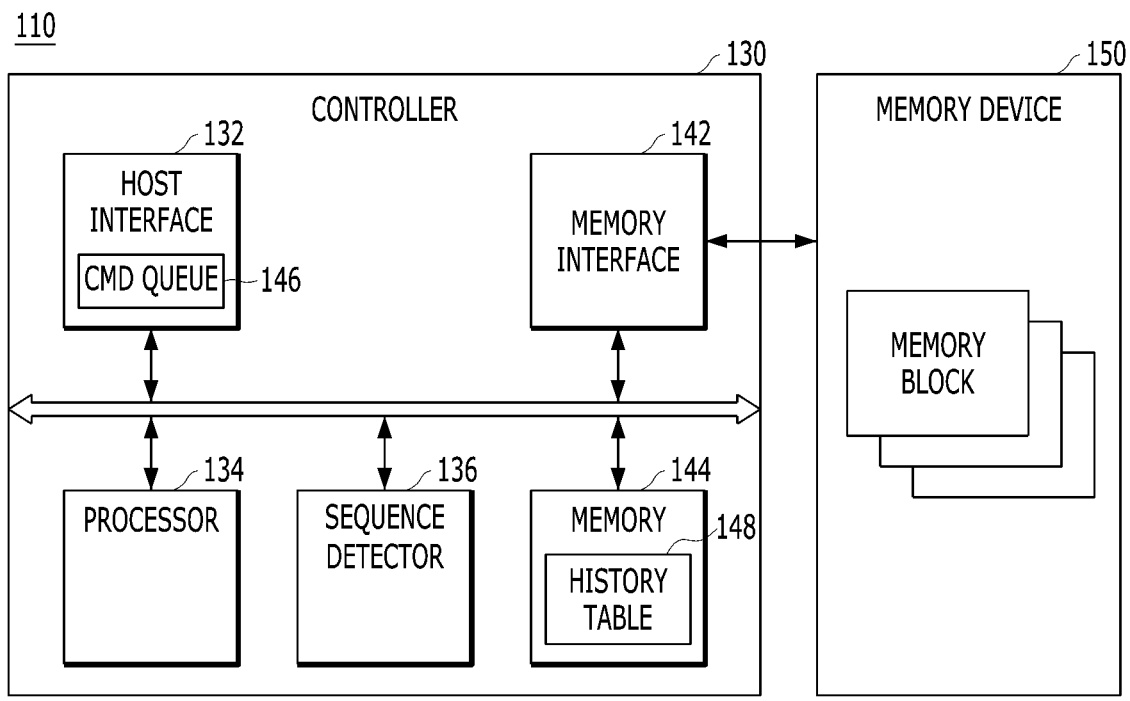
FIG. 2 is a diagram illustrating an example of a memory system in accordance with an embodiment of the present invention.

FIG. 2 is a diagram illustrating an example of the memory system 100 in accordance with an embodiment of the present invention.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a sequence detector 136, a memory I/F 142, and a memory 144 all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host I/F 132 may be driven through firmware referred to as a host interface layer (HIL) in order to exchange data with the host.

The host interface 132 may queue a command received from the host 102 in the command queue 146. The host interface 132 may queue a plurality of commands in the command queue 146. The command queue 146 may include a queue state register (not illustrated) for informing the host 102 of a command which can be currently processed among the queued commands. The host interface 132 may control a command, which can be processed among the queued commands, to be preferentially processed, using the queue state register (not illustrated). For example, the host 102 may provide the memory system 110 with write data corresponding to a write command which can be currently processed, by referring to the queue state register corresponding to the write command.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150. The memory I/F 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the memory device 150, and data when the data write/read operation is performed. In order to store such data, the memory 144 may include a program memory, data memory, write buffer/cache, read buffer/cache, data buffer/cache, map buffer/cache or the like.

The memory 144 may store a history table 148 for logging information on a set number of recently processed data chunks, in order to determine whether the recently processed data chunks are sequential. For example, the sequence detector 136 may log information into the history table 148 in response to a write command of the host 102, the information being associated with the logical addresses of data chunks which have been recently programmed to the memory device 150.

Each of the data chunks may correspond to a plurality of logical addresses. The plurality of logical addresses corresponding to a single data chunk may be sequential by a logical address length from a start logical address thereof. For example, a certain data chunk may correspond to logical addresses from '0' to '9'. The logical addresses corresponding to the certain data chunk may be sequential by a logical address length of '10' from the start logical address '0'. The history table 148 may include the start logical addresses and logical address length information of recently processed data chunks.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform an operation requested by the host 102 through the processor 134, which is realized as a microprocessor or a CPU. In other words, the controller 130 may perform a command operation corresponding to a command received from the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation onto the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

The sequence detector 136 may determine, by referring to the history table 148, whether a set number of recently processed data chunks are sequential based on the lengths and the logical-address-adjacency of the data chunks. In an implementation, the sequence detector 136 may be loaded to the memory 144 and driven by the processor 134 or implemented as a hardware device.

When the determination result of the sequence detector 136 indicates that the set number of data chunks are sequential data chunks, the processor 134 may perform the sequential operation. The sequential operation may include a foreground operation and a background operation. As an example of the background sequential operation, the memory system 110 may change the performance frequency of a garbage collection operation. As an example of the foreground sequential operation, the memory system 110 may store data chunks, which are to be subsequently processed after the determination and before the next determination, in the sequential memory region. Since the recently processed data chunks are determined to be sequential data chunks, it is highly likely that the data chunks which are to be subsequently processed are also sequential data chunks.

Figure 3:
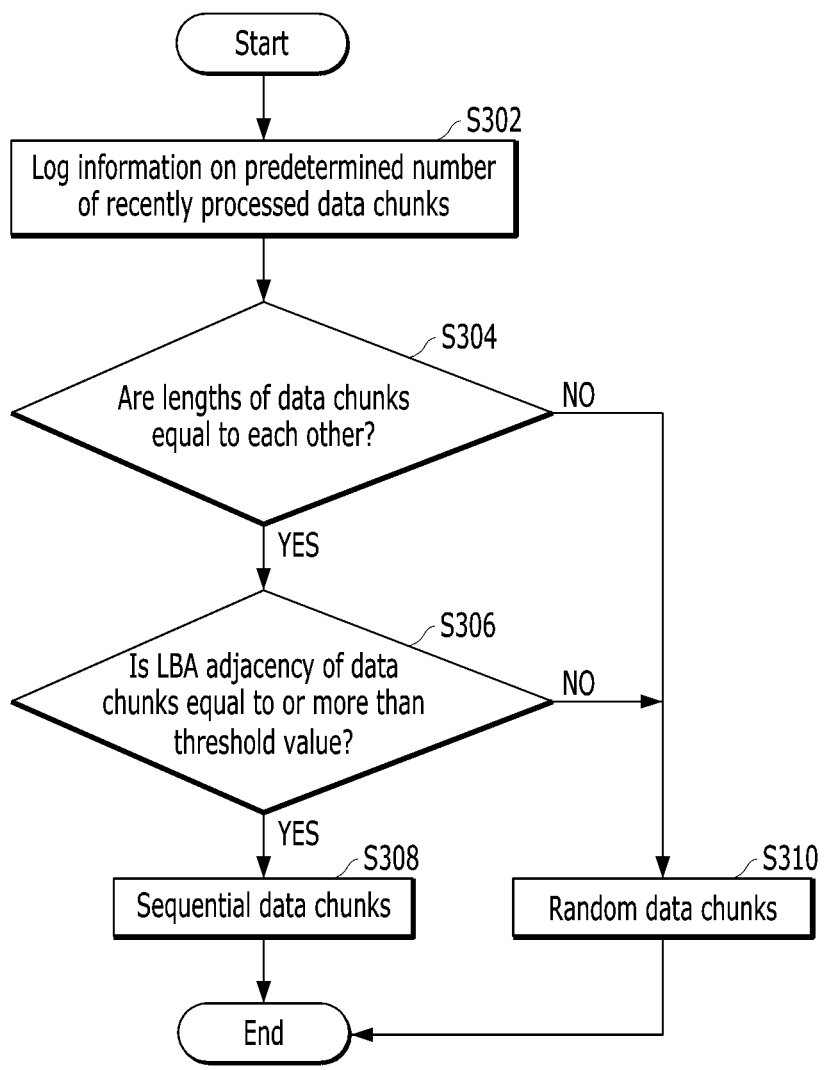
FIG. 3 is a flowchart illustrating an operation of a controller in accordance with an embodiment of the present invention.

FIG. 3 is a flowchart illustrating an operation of the controller 130 in accordance with an embodiment of the present invention. Specifically, FIG. 3 is a flowchart for describing an operation in which the sequence detector 136 determines whether recently logged data chunks are sequential data chunks, in accordance with an embodiment of the present invention.

In step S302, the sequence detector 136 may log information of recently processed data chunks into the history table 148. The information for each of the data chunks may include a start logical address and a logical address length corresponding to the data chunk.

The sequence detector 136 may determine whether the lengths of recently processed data chunks are equal to each other, by referring to the logical address length information logged into the history table 148, in step S304. The step S304 may periodically performed. For example, the step S304 may performed each time a set number of data chunks are processed.

The host 102 may divide data, which has a larger length than a set length, into a plurality of data chunks each having the set length, and then provide the plurality of data chunks to the memory system 110. The host 102 may provide data, which has a smaller length than the set length, as one data chunk to the memory system 110. Therefore, all of the plurality of data chunks constituting the sequential data may have the same length, except the last data chunk.

When the lengths of the set number of recently processed data chunks are different from each other ("NO" in step S304), the sequence detector 136 may determine that small data chunks which are not sequential with each other, i.e. random data chunks, have been recently processed, in step S310.

When the lengths of the set number of recently processed data chunks are equal to each other, it is likely that data chunks constituting sequential data have been received. When the lengths of the set number of recently processed data chunks are equal to each other ("YES" in step S304), the sequence detector 136 may determine whether the logical-address-adjacency of the set number of recently processed data chunks is equal to or more than a threshold value, in step S306. The logical-address-adjacency may indicate similar values for the logical addresses of the set number of recently processed data chunks. When the lengths of the recently processed data chunks are equal to each other and the recently processed data chunks correspond to logical addresses having similar values, the recently processed data chunks may be regarded as sequential data chunks. The method for determining the logical-address-adjacency will be described in detail with reference to FIGS. 4 and 5.

When the logical-address-adjacency of the recently processed data chunks is equal to or more than the threshold value ("YES" in step S306), the sequence detector 136 may determine that the set number of recently processed data chunks are sequential, in step S308. When the recently processed data chunks are sequential data chunks, it is highly likely that data chunks to be subsequently processed are also sequential data chunks. Therefore, the processor 134 may perform a sequential operation until the next determination. For example, the processor 134 may perform the sequential operation on the set number of subsequently provided data chunks. After the set number of subsequently provided data chunks are processed, the step S304 may be performed again. The sequential operation may include at least one of the foreground operation and the background operation which have been described with reference to FIG. 2.

When the logical-address-adjacency of the recently processed data chunks is less than the threshold value ("NO" in step S306), the sequence detector 136 may determine that data chunks which are not sequential with each other, i.e. random data chunks, have been recently processed, in step S310. When the recently processed data chunks are random data chunks, it is highly likely that data chunks to be subsequently processed are also random data chunks. Therefore, the processor 134 may perform a random operation until the next determination. For example, the processor 134 may perform the random operation on the set number of subsequently provided data chunks. After the set number of subsequently provided data chunks are processed, the step S304 may be performed again.

The random operation indicates an operation which is performed when the recently processed data chunks are random data chunks. As an example of the random operation, the processor 134 may perform the garbage collection operation more frequently than when the recently processed data chunks are sequential data chunks, thereby making fragmentized memory spaces into a large memory space. As an example of the random operation, the processor 134 may store random data in a random memory region separate from the sequential data.

The sequence detector 136 may periodically perform the steps S304 to S310 to continuously determine whether the sequence of data processed by the memory system 110 is changed, and perform the sequential operation or the random operation depending on the continuity of the data.

Figure 4:
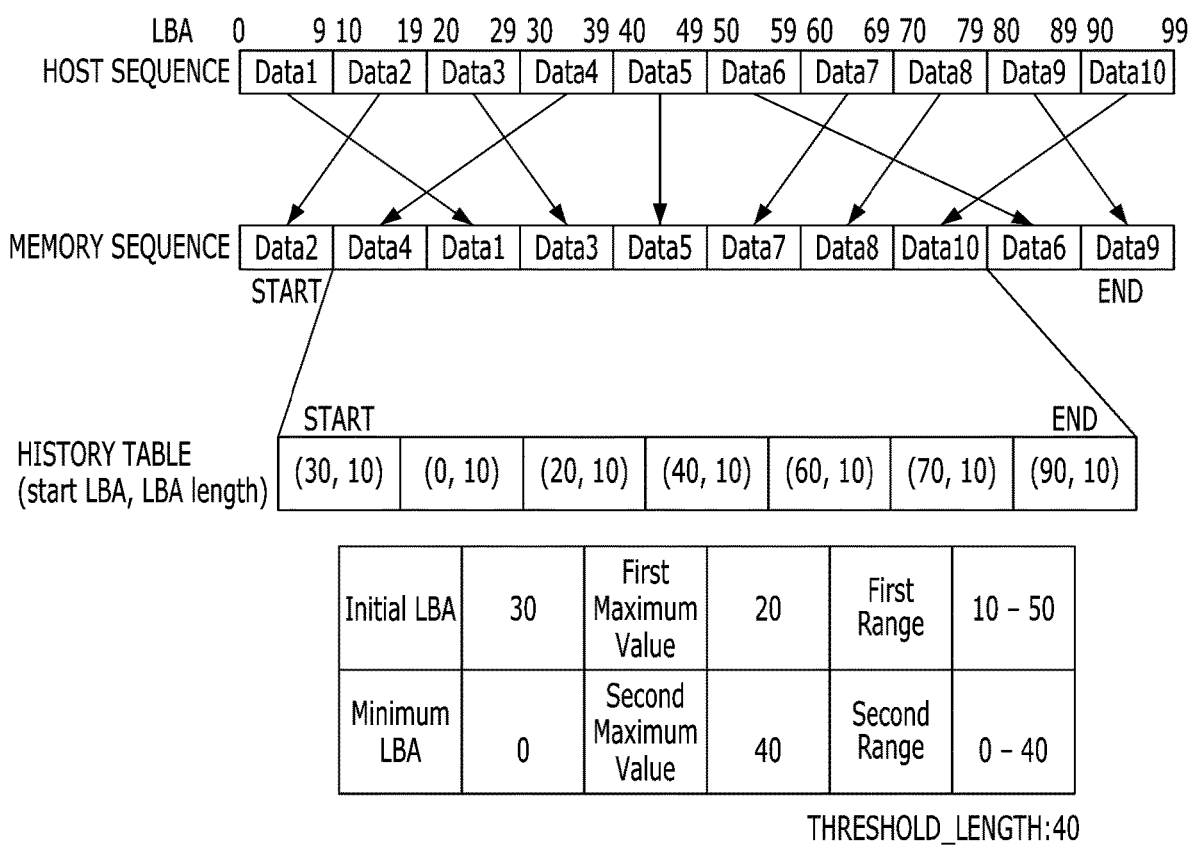
FIG. 4 is a diagram for describing logical-address-adjacency in accordance with an embodiment of the present invention.

FIG. 4 is a diagram for describing logical-address-adjacency in accordance with the present embodiment. FIG. 4 illustrates the case in which the host 102 stores first to tenth data chunks constituting sequential data in the memory system 110.

For example, the host 102 may divide sequential data, whose logical addresses are sequential from '0' to '99', into data chunks whose logical address lengths are '10', and provide the data chunks to the memory system 110. In FIG. 4, a host sequence indicates the sequence of the first to tenth data chunks based on the logical addresses of the first to tenth data chunks. FIG. 4 illustrates the start logical addresses and the end logical addresses of the respective data chunks.

The memory system 110 may not necessarily receive the first to tenth data chunks in the sequence of the logical addresses of the first to tenth data chunks. The memory sequence of FIG. 4 exemplifies the sequence in which the memory system 110 receives the data chunks from the host 102. In the example of FIG. 4, the second data chunk is a data chunk received for the first time, and the ninth data chunk is a data chunk received for the last time.

The sequence detector 136 may log information on the recently processed data chunks into the history table 148. FIG. 4 illustrates the history table 148 into which the start logical addresses and the logical address lengths of seven recently processed data chunks are logged. In the example of FIG. 4, the fourth, first, third, fifth, seventh, eighth and tenth data chunks are the recently processed data chunks and information on those recently processed data chunk is logged into the history table 148. For example, the start logical address '30' and the logical address length '10' of the fourth data chunk may be logged into the history table 148, and the start logical addresses and the logical address lengths of the other data chunks may be logged in the same format.

The second data chunk may be a data chunk which has been processed before the fourth data chunk. Information corresponding to the second data chunk had been logged into the history table 148 before but may have been already removed and thus not be present at the moment. The sixth and ninth data chunks may be data chunks which have been received but are not yet processed.

The sequence detector 136 may periodically determine whether the data chunks logged in the history table 148 are sequential data chunks. In the example of FIG. 4, the logical address lengths of the recently processed data chunks are all '10' and equal to each other. Thus, the sequence detector 136 may determine the logical-address-adjacency of the logged data chunks.

The sequence detector 136 may determine, as the logical-address-adjacency, a total length of the recently processed data chunks corresponding to "adjacent start logical addresses". Among the start logical addresses logged into the history table 148, the sequence detector 136 may determine the adjacent start logical addresses, to be start logical addresses having a value within a set range from the initial logical address or the minimum logical address, among the start logical addresses logged into the history table 148. The initial logical address indicates a start logical address which has been initially logged among the logged start logical addresses, and the minimum logical address indicates a start logical address having the minimum value among the logged start logical addresses.

For example, the sequence detector 136 may determine that start logical addresses, which have a difference less than a first maximum difference from the start logical address that has been initially logged or have a difference less than a second maximum difference from the start logical address having the minimum value, among the start logical addresses, are adjacent start logical addresses. The first maximum difference and the second maximum difference may be experimentally determined in advance.

In the example of FIG. 4, the initial logical address is '30' corresponding to the fourth data chunk. The first maximum difference is 20 and thus the first range may be 10 to 50. The first maximum difference and thus the first range may be changed by a designer. Logical addresses belonging to a logical address range of '10' to '50' have differences less than the first maximum difference from the initial logical address. In FIG. 4, the logical address range of '10' to '50' is set to the first range.

The minimum logical address is '0' corresponding to the first data chunk. The second maximum difference is 40 and thus the second range may be 0 to 40. The second maximum difference and thus the second range may be changed by a designer. Logical addresses belonging to a logical address range of '0 to '40' have differences less than the second maximum difference from the minimum logical address. In FIG. 4, the logical address range of '0' to '40' is set to the second range.

The sequence detector 136 may determine the logical-address-adjacency by multiplying a number of the adjacent start logical addresses and the length of any one of the recently processed data chunks corresponding to the adjacent start logical addresses. In the example of FIG. 4, the first or second range corresponds to the logical address range of '0' to '50'. In the example of FIG. 4, four start logical addresses, i.e. '30', '0', '20' and '40', belong to the first or second range. The sequence detector 136 may determine that the four start logical addresses are adjacent start logical addresses. Each of the four data chunks having the adjacent start logical addresses has a length corresponding to the logical address length of '10'. The total length of the logged logical addresses having the adjacent start logical addresses may be '40'. The sequence detector 136 may determine the logical-address-adjacency as '40'.

The sequence detector 136 may compare the logical-address-adjacency to a threshold value, and thus determine whether the recently processed data chunks are sequential data chunks based on the comparison. In the example of FIG. 4, the threshold value THRESHOLD_LENGTH may be set to '40'. Since the logical-address-adjacency of the recently processed data chunks is equal to or more than the threshold value, the sequence detector 136 may determine that the recently processed data chunks are sequential data chunks.

In the example of FIG. 4, the threshold value of the logical-address-adjacency is '40', and the length of each of the recently processed data chunks having the adjacent start logical addresses corresponds to the logical address length of '10'. Thus, when the number of data chunks having adjacent start logical addresses among the recently processed data chunks is equal to or more than '4', the sequence detector 136 may determine that the recently processed data chunks are sequential data chunks. When the length of each of the recently processed data chunks having the adjacent start logical addresses corresponds to the logical address length of '20' and the number of data chunks having adjacent start logical addresses is equal to or more than '2', the sequence detector 136 may determine that the recently processed data chunks are sequential data chunks.

In accordance with the present embodiment, although a plurality of data chunks constituting sequential data are not received according to the sequence of logical addresses thereof, or all of the data chunks are not received, the sequence detector 136 may determine that the data chunks are sequential data chunks.

Figure 5:
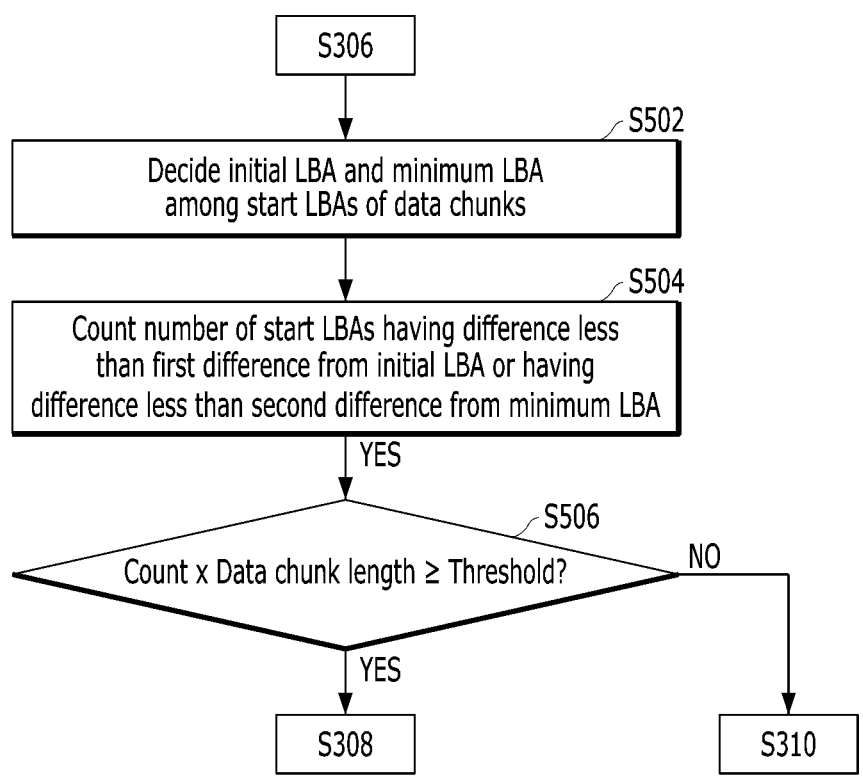
FIG. 5 is a flowchart illustrating an operation of a controller in accordance with an embodiment of the present invention.

FIG. 5 is a flowchart illustrating an operation of the controller 130 in accordance with the present embodiment. Specifically, FIG. 5 is a flowchart for describing the operation of step S306 in detail.

In step S502, the sequence detector 136 may determine the initial logical address and the minimum logical address among the start logical addresses of the recently processed data chunks.

In step S504, the sequence detector 136 may count the number of the adjacent start logical addresses having a difference less than the first difference value from the initial logical address, or the number of start logical addresses having a difference less than the second difference value from the minimum logical address, among the recently processed start logical addresses.

In step S506, the sequence detector 136 may determine whether logical-address-adjacency which is determined when the product of the number of the adjacent start logical addresses and the lengths of the data chunks is equal to or more than the threshold value. For example, the sequence detector 136 may determine the logical-address-adjacency as the product of the number of the adjacent start logical addresses and the length of any one of the data chunks.

When the product of the number of the adjacent start logical addresses and the length of any one of the data chunks is equal to or more than the threshold value ("YES" in step S506), the sequence detector 136 may determine that the recently processed data chunks are sequential, and thus the process may go to step S308.

When the product of the number of the adjacent start logical addresses and the length of any one of the data chunks is less than the threshold value ("NO" in step S506), the sequence detector 136 may determine the recently processed data chunks are not sequential, and thus the process may go to step S310.

In accordance with the present embodiment, although a plurality of data chunks for sequential data are not necessarily received in sequence, the memory system 110 may determine whether the data chunks are data chunks for sequential data. According to the determination result, the memory system 110 may perform a sequential operation in time, thereby improving the performance thereof.

Although various embodiments have been described for illustrative purposes, it will be apparent to those skilled in the art that various changes and modifications may be made without departing from the spirit and scope of the invention as defined in the following claims.

What is claimed is:

1. A controller for controlling a memory device that stores data, comprising:
   a sequence detector suitable for determining, each time a set number of data chunks are processed, whether the set number of recently processed data chunks are sequential data chunks, based on lengths of the data chunks and logical-address-adjacency of the data chunks; and
   a processor suitable for performing a sequential operation according to the determination result until next determination,
   wherein the sequence detector is driven by the processor and implemented as a hardware device, and
   wherein the sequence detector determines the logical-address-adjacency of the data chunks depending on whether the lengths of the data chunks are equal to each other,
   wherein the sequence detector determines the logical-address-adjacency based on the lengths of the data chunks and a number of adjacent start logical addresses having a difference less than a first difference value from an initial logical address or having a difference less than a second difference value from a minimum logical address, the initial and minimum logical addresses being among start logical addresses of the data chunks.

2. The controller of claim 1,
   wherein the sequence detector further determines that the data chunks are sequential data chunks, depending on whether the logical-address-adjacency is equal to or more than a threshold value.

3. The controller of claim 2, wherein the sequence detector determines that the data chunks are random data chunks, when the lengths of the data chunks are not equal to each other.

4. The controller of claim 1, wherein the logical-address-adjacency is a product of the length of any one of the data chunks and the number of adjacent start logical addresses.

5. The controller of claim 1, wherein the sequential operation comprises an operation of controlling the memory device to program the set number of data chunks, which are to be subsequently processed, to a sequential memory region.

6. The controller of claim 1, wherein the sequential operation comprises an operation of performing a garbage collection operation on the memory device at a lower frequency than when the data chunks are not sequential data chunks.

7. The controller of claim 1, further comprising a non-transitory memory suitable for storing length information and start logical address information of the data chunks.

8. An operation method of a controller for controlling a memory device, the operation method comprising:
- determining, each time a set number of data chunks are processed, whether the set number of recently processed data chunks are sequential data chunks, based on lengths of the data chunks and logical-address-adjacency of the data chunks;
- determining the logical-address-adjacency of the data chunks depending on whether the lengths of the data chunks are equal to each other, and
- performing a sequential operation according to the determination result until next determination,
- wherein the logical-address-adjacency of the data chunks is determined based on the lengths of the data chunks and a number of adjacent start logical addresses having a difference less than a first difference value from an initial logical address or having a difference less than a second difference value from a minimum logical address, the initial and minimum logical addresses being among start logical addresses of the data chunks.

9. The operation method of claim 8,
- wherein the determining includes determining that the data chunks are sequential data chunks, depending on whether the logical-address-adjacency is equal to or more than a threshold value.

10. The operation method of claim 9, wherein the determining further includes determining that the data chunks are random data chunks when the lengths of the data chunks are not equal to each other.

11. The operation method of claim 8, wherein the logical-address-adjacency of the data chunks is a product of the length of any one of the data chunks and the number of adjacent start logical addresses.

12. The operation method of claim 8, wherein the sequential operation comprises an operation of controlling the memory device to program the set number of data chunks, which are to be subsequently processed, to a sequential memory region.

13. The operation method of claim 8, wherein the performing of the sequential operation according to the determination result comprises performing a garbage collection operation on the memory device at a lower frequency than when the data chunks are not sequential data chunks.

14. An operating method of a controller, the operating method comprising:
- controlling a memory device to perform a write operation on a first set number of data chunks, the data chunks having the same length as one another;
- detecting adjacent start logical addresses falling within at least one among first and second ranges having an initial start logical address and a minimum start logical address among start logical addresses of the respective data chunks;
- determining the data chunks as sequential when a number of the adjacent start logical addresses is greater than a threshold; and
- controlling the memory device to perform a sequential operation on a second set number of subsequently provided data chunks based on the determination.

* * * * *